(12) United States Patent
Breuer

(10) Patent No.: US 6,292,982 B1
(45) Date of Patent: Sep. 25, 2001

(54) SLIVER DEFLECTING MECHANISM IN A REGULATED DRAW FRAME

(75) Inventor: Achim Breuer, Aachen (DE)

(73) Assignee: Trützschler GmbH & Co. KG, Mönchengladbach (DE)

( * ) Notice: Subject to any disclaimer, the term of this patent is extended or adjusted under 35 U.S.C. 154(b) by 0 days.

(21) Appl. No.: 09/642,881

(22) Filed: Aug. 22, 2000

Related U.S. Application Data

(63) Continuation of application No. 09/503,319, filed on Feb. 14, 2000, now abandoned.

(30) Foreign Application Priority Data

Feb. 13, 1999 (DE) .............................................. 199 06 139

(51) Int. Cl.$^7$ .................................................. D01H 5/32
(52) U.S. Cl. ................................................................ 19/239
(58) Field of Search ............................. 19/236, 237, 238, 19/239, 240, 150, 157

(56) References Cited

U.S. PATENT DOCUMENTS

| 2,905,976 | * | 9/1959 | Matthew et al. ................. 19/239 |
| 4,075,739 | | 2/1978 | Staheli . |
| 4,864,694 | * | 9/1989 | Konig et al. ..................... 19/240 |
| 5,230,125 | | 7/1993 | Clement et al. . |
| 5,461,757 | | 10/1995 | Leifeld . |
| 5,490,308 | * | 2/1996 | Huber et al. ..................... 19/239 |
| 5,535,488 | * | 7/1996 | Yao et al. .......................... 19/98 |
| 5,815,889 | * | 10/1998 | Barth et al. ...................... 19/240 |

FOREIGN PATENT DOCUMENTS 821023   9/1959  (GB) .

* cited by examiner

*Primary Examiner*—Danny Worrell
(74) *Attorney, Agent, or Firm*—Venable; Gabor J. Kelemen

(57) ABSTRACT

A regulated draw unit for drawing sliver running therethrough includes a plurality of roll pairs each defining respective nips through which the sliver consecutively passes in a running direction. A pressure bar which is situated between two adjoining roll pairs has a region for contacting the running sliver. The pressure bar is supported in such a manner that the pressure bar region is spaced from an imaginary straight line extending from the nips of the two adjoining roll pairs, whereby the running sliver is deflected. A measuring device is coupled to the pressure bar for emitting signals representing forces applied to the pressure bar by the running, deflected sliver.

18 Claims, 7 Drawing Sheets

SLIVER DEFLECTING MECHANISM IN A REGULATED DRAW FRAME

CROSS REFERENCE TO RELATED APPLICATION

This application is a continuation of application Ser. No. 09/503,319 filed Feb. 14, 2000, abandoned.

This application claims the priority of German Application No. 199 06 139.4 filed Feb. 13, 1999, which is incorporated herein by reference.

BACKGROUND OF THE INVENTION

This invention relates to a regulated draw frame for a sliver bundle composed of cotton or chemical fibers or the like and is of the type which has at least one draw field, a regulated drive system for determining the extent of draw in the draw field, a programmable control device for the drive system and at least one sensor to determine the mass of the running fiber per length unit at a measuring location. A signal determining the extent of draw is stored for a predetermined period in a memory of the control device. Information for adapting and/or determining the quality of the input slivers is extracted from the stored values. Such information is to include, for example, the CV value of the input sliver bundle, its spectrogram and/or its length variation curve. The signal determining the extent of draw may be an output signal of a sensor or a setting signal for the drive system. Sliver sensors at the intake end and at the outlet end of the draw unit are provided for measuring the mass fluctuations of the slivers.

The above-outlined conventional arrangement has, among others, the following disadvantages:

The adaptation of the draw unit is limited to the regulation of the principal drawing process, that is, to an rpm regulation of the drive motors for the rolls of the draw unit. The information is to be gleaned only from data relating to the input sliver bundle. Obtaining the information has to be performed by a complex system and further, the adaptation is provided only for a certain processed fiber lot.

SUMMARY OF THE INVENTION

It is an object of the invention to provide an improved regulated draw frame of the above-outlined type from which the discussed disadvantages are eliminated and which, in particular, significantly improves the adaptation of the draw frame to each fiber lot and/or to any quality changes of the produced fiber structure.

This object and others to become apparent as the specification progresses, are accomplished by the invention, according to which, briefly stated, the regulated draw unit for drawing sliver running therethrough includes a plurality of roll pairs each defining respective nips through which the sliver consecutively passes in a running direction. A pressure bar which is situated between two adjoining roll pairs has a region for contacting the running sliver. The pressure bar is supported in such a manner that the pressure bar region is spaced from an imaginary straight line extending from the nips of the two adjoining roll pairs, whereby the running sliver is deflected. A measuring device is coupled to the pressure bar for emitting signals representing forces applied to the pressure bar by the running, deflected sliver.

By virtue of the invention, an adaptation (setting) of the draw frame can be significantly improved. Undesired deviations from the desired magnitudes such as machine-specific values and/or values relating to fiber technology in each fiber lot and/or quality changes of the produced fiber may be recognized in a simple manner from the electric signals. The kind and extent of the deviation is determined. Advantageously, undesired deviations may be recognized during operation and may serve for adapting the draw frame, for example, by changing the clamping line (nip) distances and/or draws by the operating personnel. The invention further permits a computer-assisted evaluation and a corresponding adaptation of the draw unit based on the results of evaluation either by the operating personnel or automatically by the computer.

BRIEF DESCRIPTION OF THE DRAWINGS

FIG. 4b is a front elevational view of the construction shown in FIG. 4a.

DESCRIPTION OF THE PREFERRED EMBODIMENTS

Figure 1:
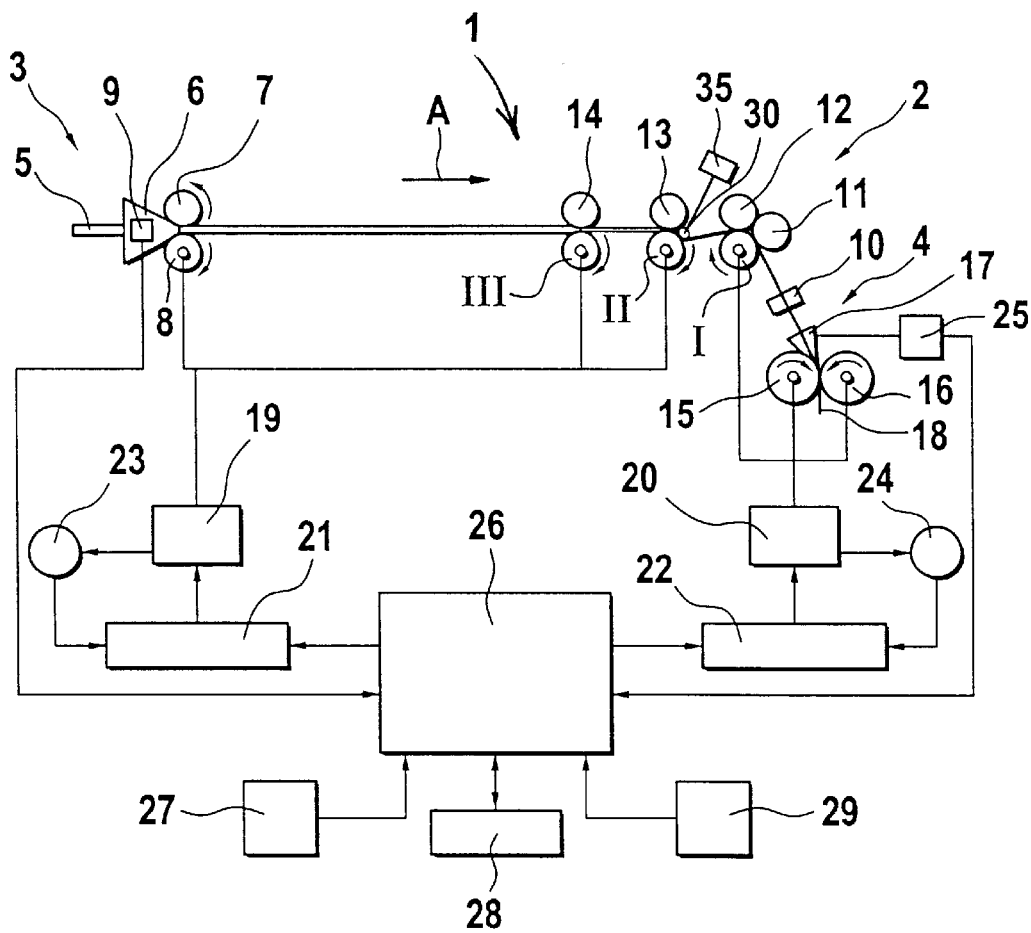
FIG. 1 is a schematic side elevational view of a regulated draw frame incorporating the invention.

FIG. 1 schematically illustrates a draw frame 1 which may be, for example, an HSR model manufactured by Trützschler GmbH & Co. KG, Mönchengladbach, Germany. The draw frame 1 includes a draw unit 2 having a draw unit inlet 3 and a draw unit outlet 4. The slivers 5 are pulled by withdrawing rolls 7 and 8 from non-illustrated coiler cans into a sliver guide 6 at the draw unit inlet 3 and run through a measuring member 9.

The draw unit 2 is of the 4-over-3 type; that is, it has a lower output roll I, a lower mid roll II and a lower input roll III as well as four upper rolls 11, 12, 13 and 14. The sliver bundle 5' composed of a plurality of slivers 5 is drawn in the draw unit 2. The roll pair formed of rolls 14 and III and the roll pair formed of rolls 13 and II constitute a preliminary draw field while the roll pair composed of the rolls 13 and II and the roll 11 and the roll pair formed of rolls 12 and I constitute the principal draw field. In the draw unit outlet 4 the drawn slivers reach a sliver guide 10 and are, by means of delivery rolls 15 and 16, pulled through a sliver trumpet 17 in which the slivers are combined into a sole sliver 18 which is subsequently deposited in a coiler can. The direction of sliver run is designated with the arrow A.

The delivery rolls 7, 8, the lower input roll III and the lower mid roll II which are all coupled to one another mechanically, for example, by a toothed belt, are driven by a regulating motor 19, for which a desired rpm may be inputted. The upper rolls 13 and 14 are idlers and rotate with their associated lower roll by virtue of frictional contact. The lower output roll I and the delivery rolls 15, 16 are driven by a main motor 20. The regulating motor 19 and the main motor 20 are associated with respective regulators 21 and 22. The rpm regulation is effected by a closed regulating circuit including a tachogenerator 23 associated with the regulator 19 and a tachogenerator 24 associated with the main motor 20. At the draw unit inlet 3 a magnitude proportional to mass, for example, the cross section of the inputted slivers 5 is detected by a measuring device 9 such as described, for example, in German Offenlegungsschrift (application published without examination) 44 04 326 to which corresponds U.S. Pat. No. 5,461,757. At the draw unit outlet 4 the cross section of the exiting sliver 18 is determined by a measuring device 25 associated with the sliver trumpet 17 such as disclosed, for example, in German Offenlegungsschrift 195 37 983, to which corresponds U.S. Pat. No. 5,815,890. A central computer unit 26 (control and regulating device, such as a microcomputer with a microprocessor) transmits, to the regulator 21, setting signals of the desired magnitude for the regulating motor 19. The measuring magnitudes of both measuring devices 9 and 25 are transmitted during the drawing process to the central computer unit 26. From the measuring magnitudes of the intake measuring device 9 and from the desired values for the cross section of the exiting sliver 18 the central computer unit 26 determines the desired value for the regulating motor 19. The measuring magnitudes of the outlet measuring device 25 serves for monitoring the exiting sliver 18. With the aid of such a regulating system, fluctuations in the cross section of the inputted slivers 5 may be compensated for by suitably regulating the sliver drawing process, whereby the sliver 18 may be rendered uniform. A visual monitor 28 is connected to the computer unit 26.

A pressure bar 30 is provided in the principal draw field for deflecting the running sliver bundle 5'. As will be described later, a small-displacement force measuring element 35 is associated with the pressure bar 30.

Figure 2:
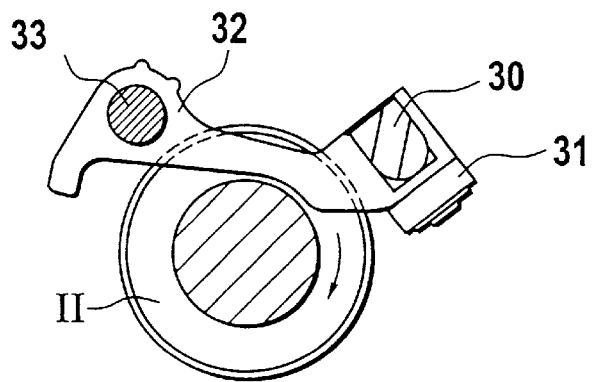
FIG. 2 is a sectional elevational view of a pressure bar and its support according to a preferred embodiment of the invention.

According to FIG. 2, the pressure bar 30 is, in the region of its opposite longitudinal ends, supported by a holding device 31 which is located at the free end of a lever 32. The other end of the lever 32 is rotatably held in a stationary bearing 33. The components which correspond to the parts 31, 32 and 33 and which are situated at the other end of the pressure bar are not visible in FIG. 2. The lever arm 32 is, during operation, immobilized and may be pivoted back about the bearing 33 when new slivers are inserted.

Figure 3A:
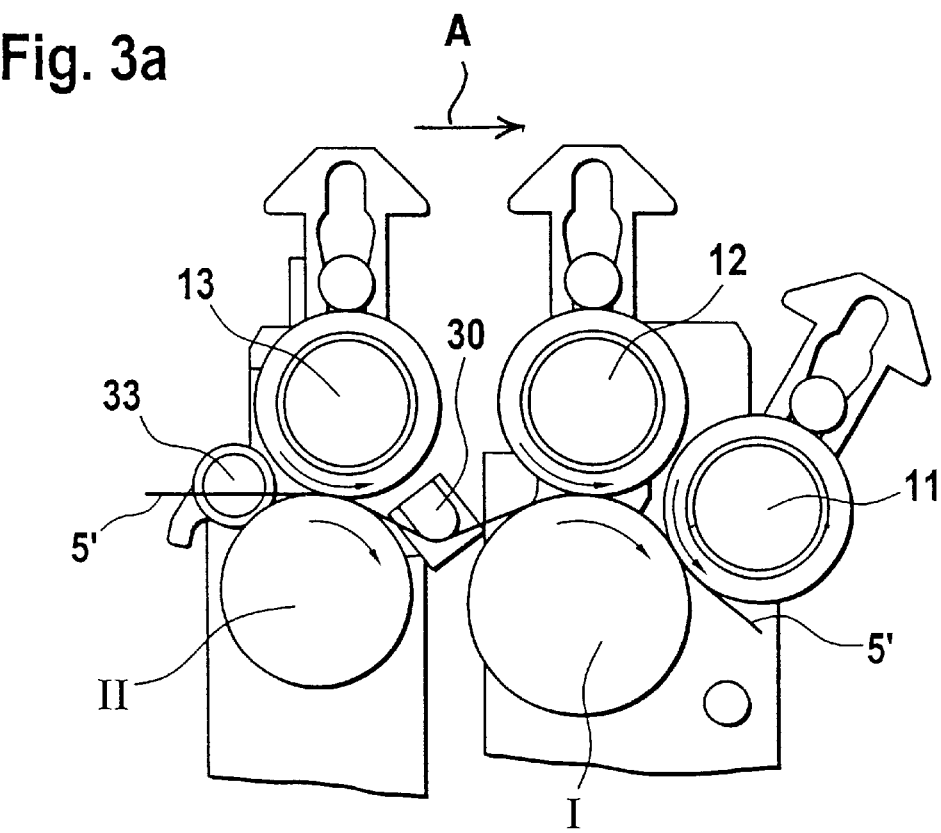
FIG. 3a is a partial side elevational view of the draw unit illustrating the pressure bar positioned in the principal draw field.

As shown in FIG. 3a, the sliver bundle 5' runs through the nip defined by the rolls 13 and II and, after being deflected downwardly by the pressure bar 13, runs through the nips defined by the rolls 12 and I and 11 and I. The sliver bundle 5' is drawn by virtue of the increasing circumferential velocities of the roll pairs in the working direction A.

Figure 3B:
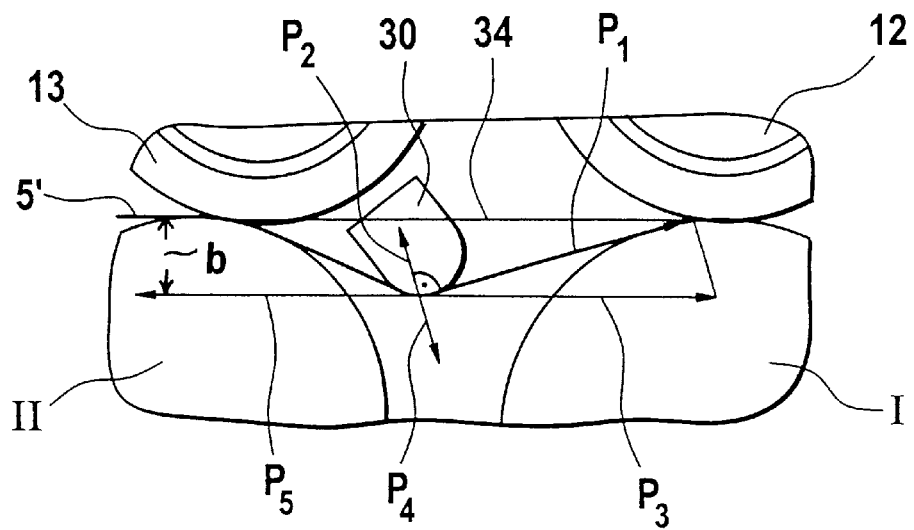
FIG. 3b is an enlarged fragmentary view of the construction shown in FIG. 3a, illustrating force components.

As shown in the enlarged illustration of 3b, in the principal draw field the straight path between the clamping lines (nips) defined by the roll pair 13, II and the roll pair 12, I is designated by the imaginary straight line 34. In the absence of the pressure bar 30 the sliver bundle 5' would travel along the line 34 without deflection in which case the drawing force, that is, the pulling force exerted on the sliver bundle 5' would act parallel to the path 34. That region of the pressure bar 30, however, which contacts the running sliver is situated at a distance b from the line 34 and thus the running sliver bundle 5' deviates from the line 34 and has a deflected course as shown in FIG. 3b. Between the pressure bar 30 and the clamping line of the rolls 12, I a drawing force $P_1$ is exerted on the deflected sliver bundle 5'. The resulting drawing force $P_1$ is composed of a force $P_2$ affecting the deflected sliver bundle 5' perpendicularly thereto and a force $P_3$ which is oriented parallel to the path 34. The force $P_2$ with which the sliver bundle 5' presses against the pressure bar 30 is in equilibrium with the oppositely directed force $P_4$ with which the pressure bar 30 presses against the sliver bundle 5'. The force $P_3$ is opposed by a force $P_5$ with which the pressure bar 30 is held stationary against the pressure of the sliver bundle 5'. The measuring magnitude which realistically represents the drawing conditions is the drawing force $P_1$ which serves for optimizing the draw unit 2. Since a measuring of the draw force $P_1$ is difficult, according to the invention, for optimizing the draw unit, the force component $P_2$ is used instead. The force component $P_2$ is proportional to the drawing force $P_1$ and perpendicular thereto. Measuring a force component which is not perpendicular to the sliver bundle 5' is in principle feasible according to the invention, but would not lead to optimal results.

Figure 4A:
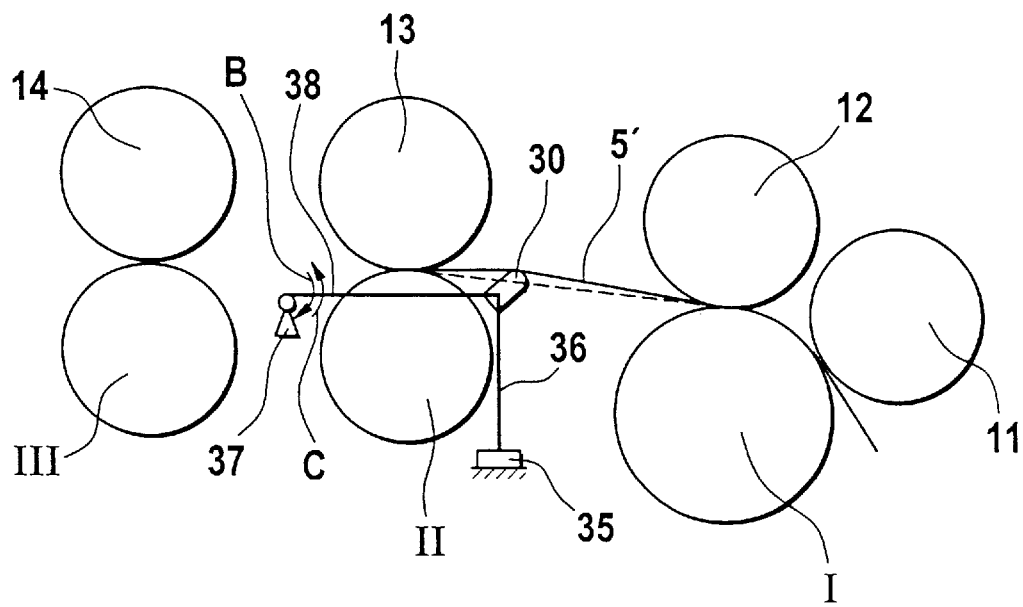
FIG. 4a is a schematic side elevational view of a pressure bar and its support in the principal draw field according to another preferred embodiment of the invention.
Figure 4B:
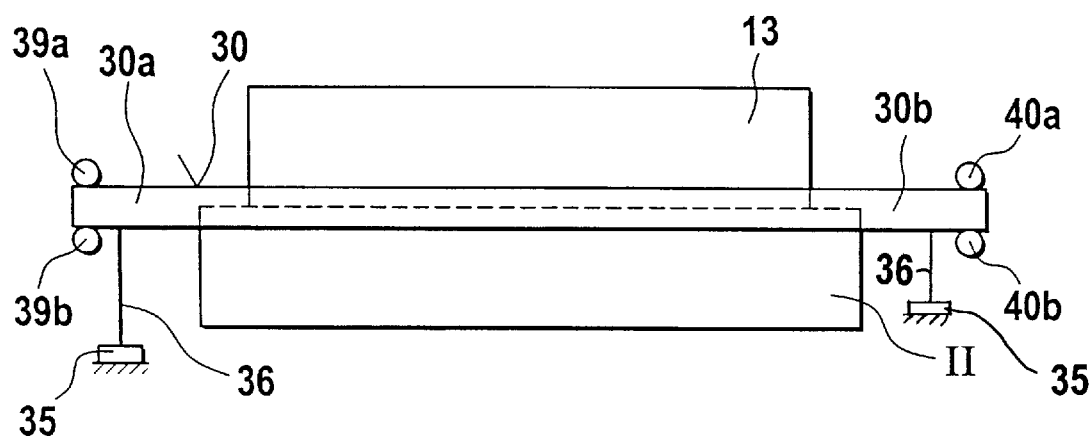

As shown in FIG. 4a, the pressure bar 30 is situated in the main drawing field and is upwardly pivotally pressed from below against the sliver bundle 5'. Thus, the sliver bundle 5' runs above the pressure bar 30; in this manner the sliver bundle 5' may at all times be inserted without lifting or removing the pressure bar 30. Below the pressure bar 30, approximately perpendicularly thereto, a stationary, small-displacement force measuring device 35 is provided which serves for determining the force $P_2$ which the sliver bundle 5' exerts on pressure bar 30. The pressure bar 30 is at one end secured to a twist-resistant support rod 36 which, with its other end, is supported on the force measuring device (box) 35. The pressure bar 30 is secured to one end of a twist resistant lever arm 38 which is, with its other end, articulated to a stationarily held rotary bearing 37, whose rotary axis takes up no torque. In this manner, the pressure bar 30 is sufficiently rigidly rotatable in the direction of the arrows B and C to measure the force $P_2$. The lever arm 38 acts against the force $P_3$. In the front elevational view of FIG. 4b the lateral supports of the pressure bar 30 are designated at 39a, 39b as well as 40a and 40b. It is seen that in the example of FIG. 4b a separate sensor 35 is associated with both ends 30a and 30b of the pressure bar 30. It is also feasible to sense the force with the sensor or sensors 53 directly at the pressure bar supports 39a, 39b and 40a, 40b.

Figure 5:
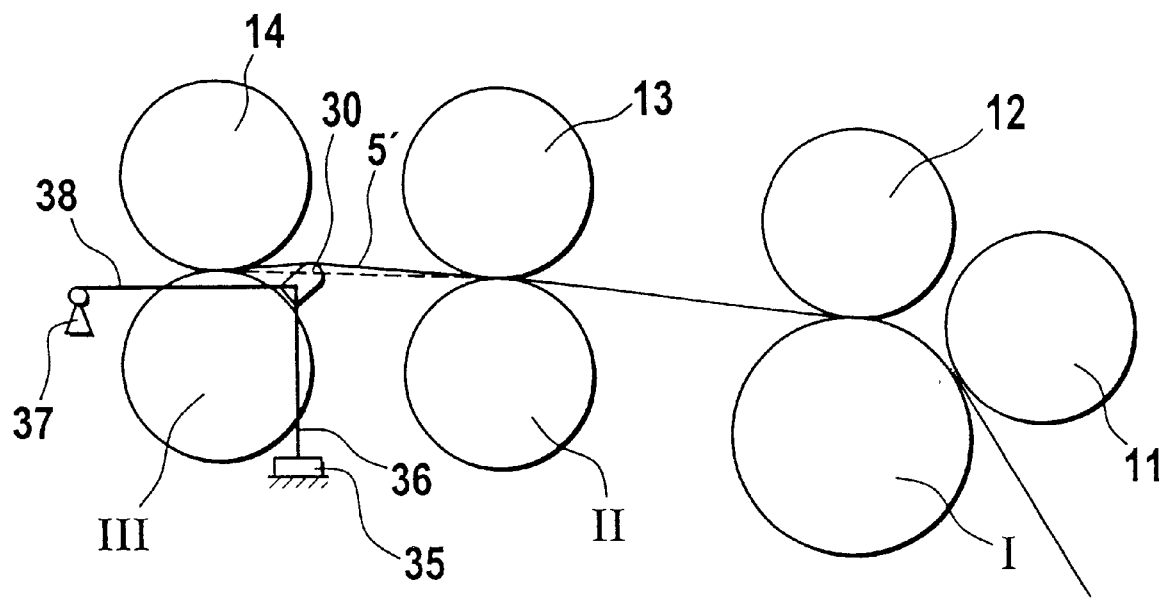
FIG. 5 is a schematic side elevational view of a pressure bar and its support in the preliminary draw field according to another preferred embodiment of the invention.

FIG. 5 shows an embodiment in which the pressure bar 30 is situated between the roll pairs 14, III and 13, II in the preliminary draw field. The structural features of the mounting of the pressure bar 30 and the measuring of the force component $P_2$ correspond to those described in connection with FIG. 4a.

Figure 6:
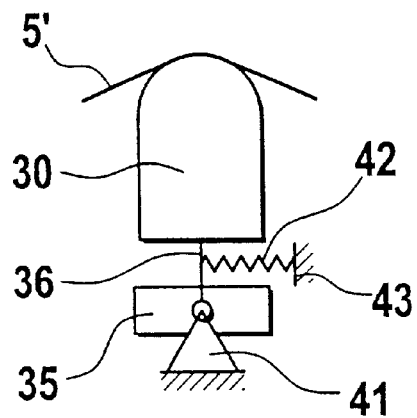
FIG. 6 is a schematic side elevational view of yet another embodiment of the support and positioning of the pressure bar.

Turning to FIG. 6, the pressure bar 30 is positioned by the supporting rod 36 on the force measuring device 35 which is rotatably mounted on a stationarily held rotary bearing 41. Thus, in this embodiment the unit composed of the measuring device 35, the supporting rod 36 and the pressure bar 30 are pivotal in a plane which is parallel to the line 34 shown in FIG. 3*b*. The longitudinal axis of the support 36 intersects the rotary axis of the bearing 41. The support 36 is horizontally biased by a spring 42 which may be a compression spring and which is attached to a stationary support 43. The measuring device 35 permits only a small-displacement shift of the pressure bar 30 and the support 36 and represents therefore a relatively very hard spring (that is, a relatively large resilient resistance), while the spring 42 permits a greater displacement-dependent shift of the pressure bar 30 and the support 36 and is therefore a much softer spring (that is, it has a relatively small resilient resistance). The spring 42 is adjusted in such a manner that the pressure bar 30 moves against the force of the spring only under the effect of large lateral forces, for example, in case of undesired thickened sliver portions or if manually pushed aside. During normal operation the pressure bar 30 does not yield in the direction of the spring 42, that is, the measuring of the force $P_2$ is not affected by other forces.

Figure 7A:
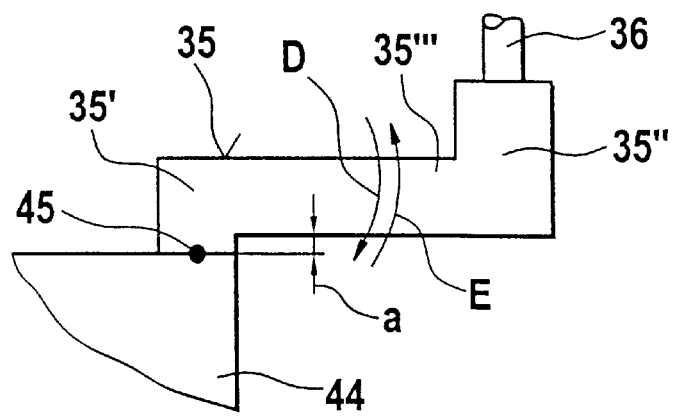
FIG. 7a is a schematic view of a force sensor including expansion measuring strips.

Turning to FIG. 7*a*, as a force sensor, a load cell 35 is provided whose one end 35' is stationarily secured to a base 44 which may be a machine frame component. The free other end 35" and a mid component 35''' of the load cell extend, similarly to a cantilevered beam, above and beyond the base 44. The lower end of the support 36 engages the free end 35" which, together with the mid component 35''', is rotatable about an axis 45 in the region of the end 35' in the direction shown by the curved arrows D and E. Such local rotary excursions which occur upon pressure changes imparted by the support 36 to the end 35", are converted to electrical pulses by means of expansion measuring strips in the cell 35. The electrical pulses are applied to the regulating device 26 by conductors. The lower surface of the mid component 35''' projects beyond the lower boundary surface of the end 35' by a distance a. As a result, a rotation about the axis 45 is possible without the regions 35" and 35''' touching the base 44, even if the base 44 passes under the entire cell 35.

Figure 7B:
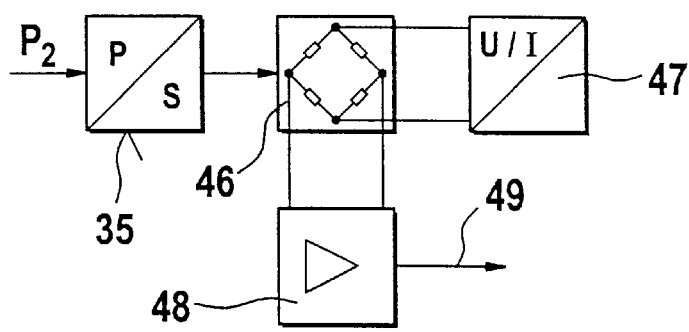
FIG. 7b is a block diagram illustrating the principle of conversion of force signals to electric signals.

FIG. 7*b* shows the conversion principle of the load cell 35 for an electric measurement of the force $P_2$ which is first transformed to an excursion. The electric measuring circuit which includes a Wheatstone bridge 46, an auxiliary energy source 47 and an amplifier 48 produces an electric output signal 49.

Figure 8:
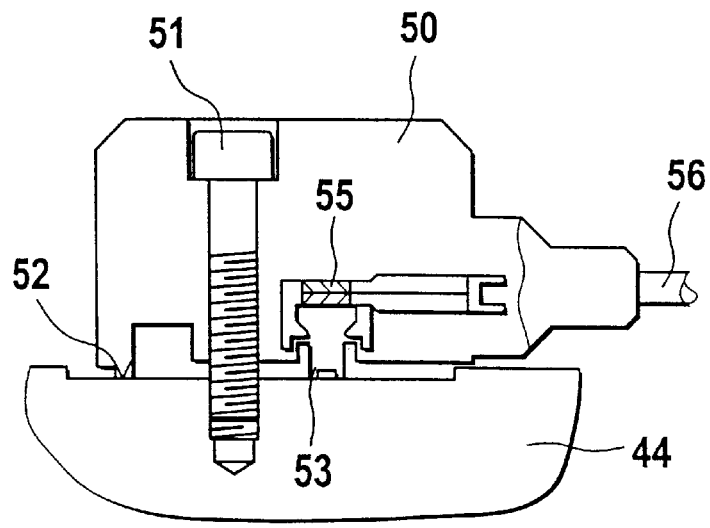
FIG. 8 is a sectional elevational view of a piezoelectric force sensor forming part of the structure according to the invention.

The force sensor according to FIG. 8 is a piezoelectric expansion sensor having a receiving (input) body 50 secured with a single screw 51 to the base 44 which may be, for example, the machine frame. The body 50 is supported on a blade-like surface 52 and an annular surface 53 and transmits the deformation between these two locations of support to a pair of quartz disks 55. The housing serves as an elastic monitoring member and transforms the distance change into a force (approximately 1.5 N/$\mu$m). The quartz disks 55 exposed to a shearing force generate an electric charge which is proportionate to such a force and which is applied to an amplifier via a conductor 56. The piezoelectric force sensor may have a nominal expansion, for example, of $2\times10^{-3}$ mm. With the use of a piezoelectric force sensor the deformation may be maintained by orders of magnitude smaller than in case of a load cell 35 having expansion measuring strips according to FIGS. 7*a* and 7*b*.

Figure 9:
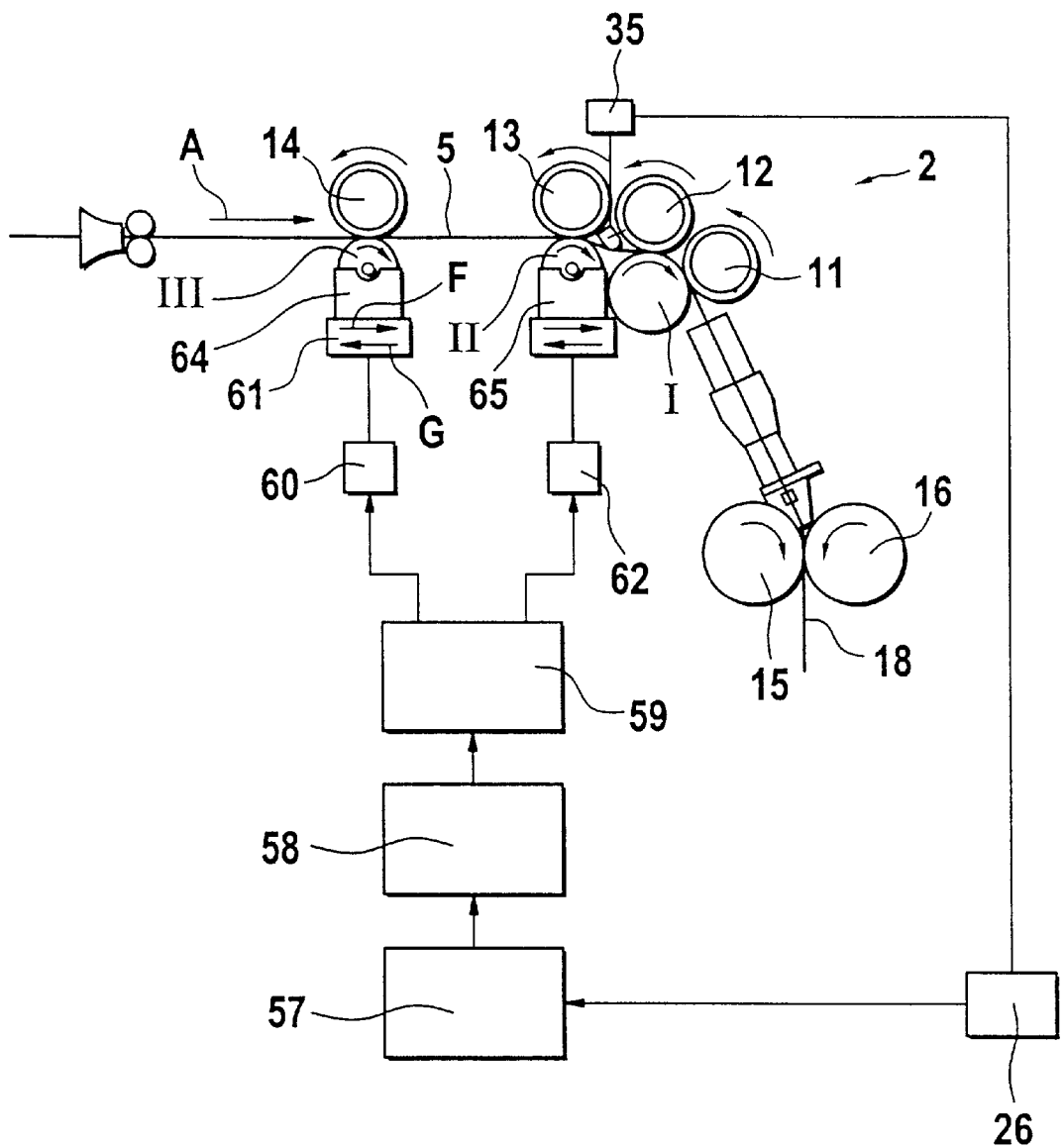
FIG. 9 is a schematic side elevational view of a regulated draw frame according to FIG. 1, also showing a block diagram illustrating the evaluation of excursion of the pressure bar in the principal draw field for the automatic setting of the draw unit.

Turning to FIG. 9, the force sensing device 35 connected to the pressure bar 30 is coupled with the computer unit 26 which, in turn, applies signals to an evaluating unit 57. For an evaluation, in addition to the average value received through a time slot, the standard deviation may be used to recognize the limit regions as accurately as possible, that is, the fluctuations in the sliver draw caused by thickened or thinned sliver portions. In a similar manner characteristic curve portions, such as slopes may be evaluated. The results of such an evaluation are applied to a device 58 which, in turn, applies recommendations for machine and operational parameters to the machine control and regulating device 59 for adjusting the draw unit 2. The machine control and regulating device 59 is connected with setting members of the regulated draw frame 1. Thus, a setting motor 60 operates a shifting device 61 for the horizontal displacement of the roll pair 14, III in the direction of the arrows F and G and a setting motor 62 operates a displacing device 63 for the horizontal shifting of the roll pair 13, II in the direction of the arrows H and I. The rolls III and II are supported in respective stands 64 and 65. In this manner an automatic setting of the draw frame 2 is effected based on the results of evaluation. According to the system shown in FIG. 9, an automatic setting in the principal draw field occurs. During operation the force $P_2$ is measured and simultaneously the draw unit parameters in the principal draw field are changed as long as an accurately determined force level is reached, for example, 15 N for cotton and 25 N for PES. The force level to be reached is determined once for the various fiber materials; it is independent from the fiber length and the short fiber proportion. Therefore, the relationship between the principal draw distance and the fiber length need not be taken into account. During machine run, the forces $P_2$ are measured for each setting and the setting parameters are automatically adjusted. Preferably, the on-line force application is performed exclusively for the period of draw unit optimization to permit, based on the detected course of forces, interpretations concerning fiber length, crimp and extent of draw to optimally set the draw unit parameters.

Figure 10:
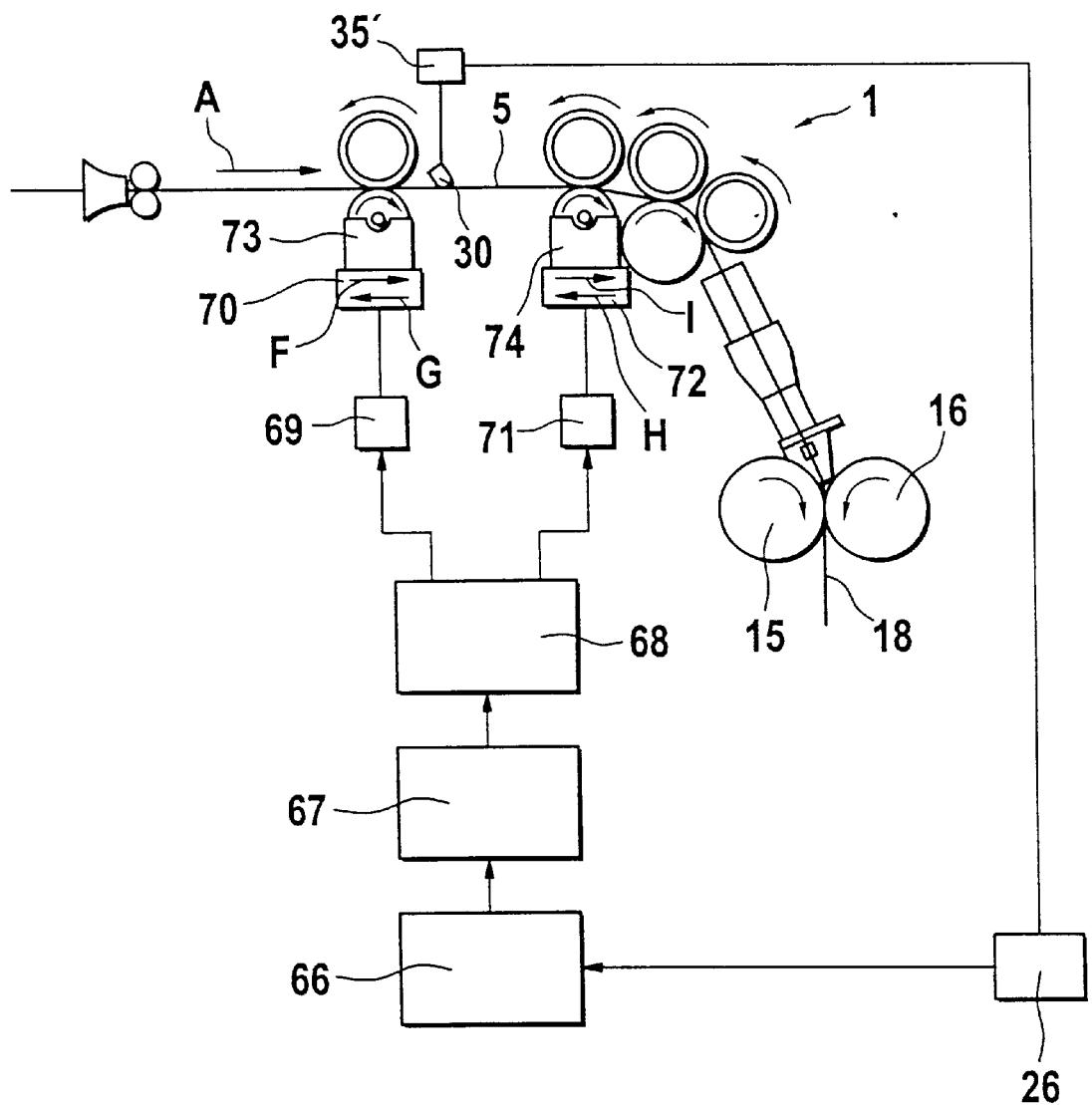
FIG. 10 is a schematic side elevational view of a regulated draw frame according to FIG. 1, also showing a block diagram illustrating the evaluation of excursion of the pressure bar in the preliminary draw field for the automatic setting of the draw unit.

Turning to FIG. 10, the pressure bar 30 is situated in the preliminary draw field. The determination of the optimal setting values and the adjustment of the automatic draw unit are performed as described in connection with the system shown in FIG. 9.

In the embodiments according to FIGS. 9 and 10 shifting elements 61, 63 and, respectively 70, 72 are used as setting members for adjusting the clamping line distances. The results of the evaluation may be used via the machine control and regulating apparatus 59 and, respectively, 68 for setting the regulating motor 19 and/or the main motor 20 (FIG. 1) and thus for changing the draw of the sliver. The evaluations may, via the machine control and regulating devices 59 or, respectively 68, also effect both procedures, that is, a change of the clamping line distances of the draw unit 2 and the change of the extent of draw. One computer unit 26 may serve a plurality of regulated draw frames, thus, the computer unit 26 of FIG. 1, may be a central unit which performs the control and regulating tasks of several regulated draw frames.

While the invention was described in connection with a regulated draw frame, it may find application in other types of fiber processing machines that include a draw assembly corresponding to the described regulated draw unit 2.

It will be understood that the above description of the present invention is susceptible to various modifications, changes and adaptations, and the same are intended to be comprehended within the meaning and range of equivalents of the appended claims.

What is claimed is:

1. A regulated draw unit for drawing sliver running therethrough, comprising (a) a plurality of roll pairs each defining respective nips through which the sliver consecutively passes in a running direction; said plurality of roll pairs including a first roll pair and a second roll pair adjoining said first roll pair downstream thereof as viewed in said running direction;

(b) a pressure bar situated between said first and second roll pairs and having a region for contacting the running sliver;

(c) support means for positioning said pressure bar such that the pressure bar region is spaced from an imaginary straight line extending from the nip of said first roll pair to the nip of said second roll pair for deflecting the running sliver; and (d) a measuring device coupled to said pressure bar for emitting signals representing forces applied by the running, deflected sliver to said pressure bar.

2. The regulated draw frame as defined in claim 1, further comprising means for rigidly connecting said pressure bar to said measuring device.

3. The regulated draw frame as defined in claim 1, further comprising means for rigidly supporting said measuring device.

4. The regulated draw frame as defined in claim 1, wherein said pressure bar is elongated in a direction transverse to said imaginary straight line and has two opposite ends; further comprising stationary bearings supporting said two ends; said measuring device being connected to one of said bearings.

5. The regulated draw frame as defined in claim 1, wherein said pressure bar is elongated in a direction transverse to said imaginary straight line and has two opposite ends; said measuring device being situated adjacent one of said two ends.

6. The regulated draw frame as defined in claim 5, wherein said measuring device is a first measuring device; further comprising a second measuring device situated adjacent the other of said two ends.

7. The regulated draw frame as defined in claim 1, further comprising (e) a programmable control system for driving said roll pairs; and (f) means for applying said signals to the system.

8. The regulated draw frame as defined in claim 7, further comprising shifting means for displacing at least some of said roll pairs relative to one another; said shifting means being connected to the control system.

9. The regulated draw frame as defined in claim 7, further comprising a monitor for visually displaying said signals.

10. The regulated draw frame as defined in claim 1, wherein said measuring device includes a small-excursion component exposed to pressing forces of said pressure bar.

11. The regulated draw frame as defined in claim 10, wherein said signals are electric signals and wherein said measuring device includes means for transforming forces exerted on said small-excursion component to said electric signals.

12. The regulated draw frame as defined in claim 10, further comprising a twist-resistant support rod rigidly connecting said pressure bar with said small-excursion component.

13. The regulated draw frame as defined in claim 12, wherein said support means comprises a pivotal support for allowing said pressure bar to swingably yield to forces exerted by the running sliver.

14. The regulated draw frame as defined in claim 13, wherein said pivotal support includes a stationarily held rotary bearing and a rigid arm articulated to said bearing and affixed to said pressure bar for maintaining a predetermined constant distance during operation between said pressure bar and said rotary bearing.

15. The regulated draw frame as defined in claim 14, wherein said rigid arm extends generally parallel to a plane containing said imaginary straight line.

16. The regulated draw frame as defined in claim 12, wherein said support means comprises a pivotal support for allowing said pressure bar to pivotally yield in a plane parallel to said imaginary straight line to forces exerted by the running sliver; said measuring device being mounted on said pivotal support for pivotal motions in unison with said support rod and said pressure bar; said measuring device, said support rod and said pressure bar forming a pivotal unit.

17. The regulated draw frame as defined in claim 16, further comprising spring means for urging said pivotal unit in a direction opposing said pivotal motions to the forces exerted by the running sliver.

18. The regulated draw frame as defined in claim 17, wherein the forces exerted by the running sliver have a first force component applied to said measuring device and a second force component opposing a force of said spring means; said measuring device having a greater resilient resistance than said spring means.

\* \* \* \* \*